(12) United States Patent
Xia et al.

(10) Patent No.: US 10,338,641 B2
(45) Date of Patent: Jul. 2, 2019

(54) SMART BRACELET

(71) Applicant: SHENZHEN ROYOLE TECHNOLOGIES CO. LTD., Shenzhen, Guangdong (CN)

(72) Inventors: Xinyuan Xia, Guangdong (CN); Weifeng Wu, Guangdong (CN)

(73) Assignee: SHENZHEN ROYOLE TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/072,556

(22) PCT Filed: Sep. 29, 2016

(86) PCT No.: PCT/CN2016/100946
§ 371 (c)(1),
(2) Date: Jul. 25, 2018

(87) PCT Pub. No.: WO2018/058471
PCT Pub. Date: Apr. 5, 2018

(65) Prior Publication Data
US 2019/0064882 A1    Feb. 28, 2019

(51) Int. Cl.
*G06F 1/16*    (2006.01)
*A44C 5/00*    (2006.01)

(52) U.S. Cl.
CPC .............. *G06F 1/1652* (2013.01); *A44C 5/00* (2013.01); *G06F 1/163* (2013.01); *G06F 1/1626* (2013.01);

(Continued)

(58) Field of Classification Search
CPC ..... G06F 1/163; G06F 1/1652; G04G 17/045; G04G 17/08
See application file for complete search history.

(56) References Cited

U.S. PATENT DOCUMENTS 5,857,217 A * 1/1999 Hsueh ................. A44C 5/0007
2/170
5,931,764 A * 8/1999 Freeman ................. G04G 9/00
361/679.03

(Continued)

FOREIGN PATENT DOCUMENTS

CN    103514809 A    1/2014
CN    103778858 A    5/2014

(Continued)

OTHER PUBLICATIONS

International search report dated Jun. 29, 2017 from corresponding application No. PCT/CN2016/100946.

*Primary Examiner* — Adrian S Wilson
(74) *Attorney, Agent, or Firm* — Hauptman Ham, LLP

(57) ABSTRACT

A smart bracelet includes a pedestal, a rotating assembly rotatably coupled to the pedestal, and a flexible display screen supported by the pedestal and the rotating assembly. When the rotating assembly is folded relative to the pedestal, the flexible display screen is bent and has a first display area. When the rotating assembly is unfolded relative to the pedestal, the flexible display screen is unfolded and has a second display area. The second display area is larger than the first display area. The display area of the smart bracelet of the present application is changeable.

18 Claims, 7 Drawing Sheets

(52) U.S. Cl.
CPC .......... *G06F 1/1635* (2013.01); *G06F 1/1643* (2013.01); *G06F 1/1656* (2013.01)

(56) References Cited

U.S. PATENT DOCUMENTS

| | | | | |
|---|---|---|---|---|
| 7,347,019 | B1* | 3/2008 | Shaw | F16F 1/025 40/607.01 |
| 7,848,093 | B2* | 12/2010 | Hardson | A44B 11/001 224/163 |
| D725,071 | S* | 3/2015 | Lee | D14/138 R |
| 9,107,287 | B2* | 8/2015 | Ryu | G06F 1/1616 |
| 9,116,567 | B2* | 8/2015 | Alberth, Jr. | G06F 1/1694 |
| 9,176,535 | B2* | 11/2015 | Bohn | G06F 1/1641 |
| D750,036 | S* | 2/2016 | Endo | D14/126 |
| 9,335,790 | B2* | 5/2016 | Stotler | G06F 1/163 |
| 9,348,369 | B2* | 5/2016 | Kee | G06F 1/1616 |
| 9,439,504 | B1* | 9/2016 | Christlieb | G06F 1/1616 |
| 9,510,470 | B2* | 11/2016 | Huitema | G06F 1/1652 |
| 9,606,654 | B2* | 3/2017 | Li | G06F 3/041 |
| 9,733,673 | B2* | 8/2017 | Fukuma | G06F 1/1652 |
| 9,786,247 | B2* | 10/2017 | Hong | G09G 5/003 |
| D802,452 | S* | 11/2017 | Paschke | D10/70 |
| 9,823,697 | B2* | 11/2017 | Hsu | G06F 1/1618 |
| 9,851,753 | B2* | 12/2017 | Gao | G06F 1/163 |
| 2002/0105778 | A1* | 8/2002 | Harada | G06F 1/1601 361/679.03 |
| 2003/0026171 | A1* | 2/2003 | Brewer | G02B 26/026 368/82 |
| 2003/0155389 | A1* | 8/2003 | Swartzentruber | A44C 5/0053 224/164 |
| 2003/0160735 | A1* | 8/2003 | Lee | G06F 3/147 345/4 |
| 2005/0237704 | A1* | 10/2005 | Ceresoli | G06F 1/163 361/679.03 |
| 2006/0050169 | A1* | 3/2006 | Misawa | G06F 1/1616 348/333.06 |
| 2006/0209218 | A1* | 9/2006 | Lee | G04G 9/00 349/1 |
| 2009/0126243 | A1* | 5/2009 | Schellingerhout | G09F 21/02 40/586 |
| 2011/0188189 | A1* | 8/2011 | Park | G05B 11/01 361/679.05 |
| 2012/0002360 | A1* | 1/2012 | Seo | G06F 1/1616 361/679.01 |
| 2012/0138647 | A1* | 6/2012 | Norling | A45F 5/00 224/267 |
| 2013/0010405 | A1 | 1/2013 | Rothkopf et al. | |
| 2013/0083496 | A1* | 4/2013 | Franklin | G06F 1/1626 361/749 |
| 2014/0337621 | A1* | 11/2014 | Nakhimov | G06F 1/163 713/168 |
| 2016/0070303 | A1 | 3/2016 | Lee et al. | |
| 2016/0081180 | A1* | 3/2016 | Huitema | H01L 51/0097 361/749 |
| 2017/0150616 | A1* | 5/2017 | Li | G06F 1/1652 |
| 2018/0039303 | A1* | 2/2018 | Hashimoto | G02F 1/167 |

FOREIGN PATENT DOCUMENTS

| | | |
|---|---|---|
| CN | 105549785 A | 5/2016 |
| EP | 2403222 A | 1/2012 |

* cited by examiner

SMART BRACELET

RELATED APPLICATION

The present application is a National Phase of International Application Number PCT/CN2016/100946, filed Sep. 29, 2016.

TECHNICAL FIELD

The application relates to a technical field of smart wearable devices, more particularly to a smart bracelet.

BACKGROUND

Smart bracelets are wearable smart devices and configured as technology products currently getting the most attention. The smart bracelets having powerful functions are silently infiltrating and changing the lives of people.

Currently, the smart bracelets configure a variety of display screens due to a requirement of the diversified functions. However, for a limitation to a shape size of the smart bracelets, and a display area of the display screen is usually very small, the display screen may only display a small amount of information and may not meet the needs of users.

SUMMARY

The technical problem of the present invention to be solved is to provide a smart bracelet with a variable display area.

In order to achieve the above objectives, the following technical solutions are adopted in the embodiments of the present application:

An embodiment of the present application provides a smart bracelet, including:

a pedestal;

a rotating assembly rotatably coupled to the pedestal; and a flexible display screen supported by the pedestal and the rotating assembly, when the rotating assembly is folded relative to the pedestal, the flexible display screen is bent and has a first display area, when the rotating assembly is unfolded relative to the pedestal, the flexible display screen is unfolded and has a second display area, and the second display area is larger than the first display area.

Compared with the prior art, the present invention has the following beneficial effects:

The smart bracelet of the present application may obtain the first display area or the second display area by rotating the rotating assembly, to make the rotating assembly to be folded or unfolded relative to the pedestal. The second display area is larger than the first display area, thus the display area of the smart bracelet is changeable to meet various display requirements, especially large-screen display requirements.

BRIEF DESCRIPTION OF THE DRAWINGS

In order to more clearly illustrate the technical solution of the present application, the accompanying drawings required for describing the embodiments will be briefly described below. Apparently, the accompanying drawings in the following description are merely the embodiments of the present application, and other drawings may be obtained by those skilled in the art according to these accompanying drawings without paying any creative labor.

DETAILED DESCRIPTION

The technical solutions in the embodiments of the present invention are clearly and completely described below with reference to the accompanying drawings in the embodiments of the present application. Apparently, the described embodiments are merely some but not all of the embodiments of the present invention. All other embodiments obtained by a person of ordinary skill in the art based on the embodiments of the present invention without creative efforts shall fall within the protection scope of the present application.

Figure 1:
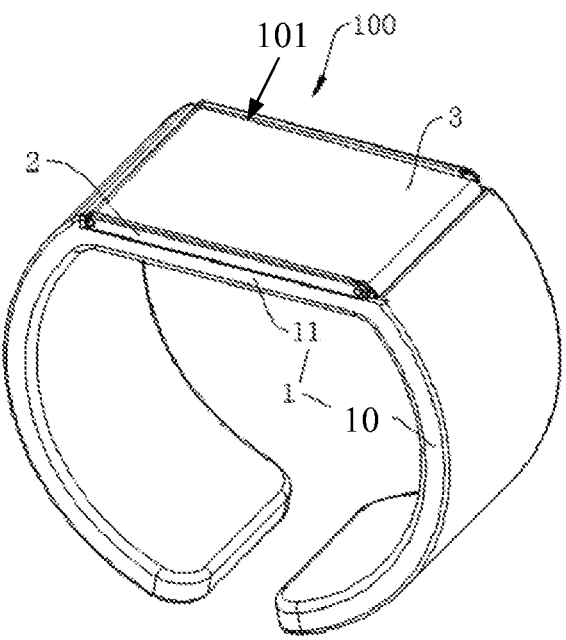
FIG. 1 is a structural schematic view of a smart bracelet being folded, provided by first exemplary embodiment of the present application.
Figure 2:
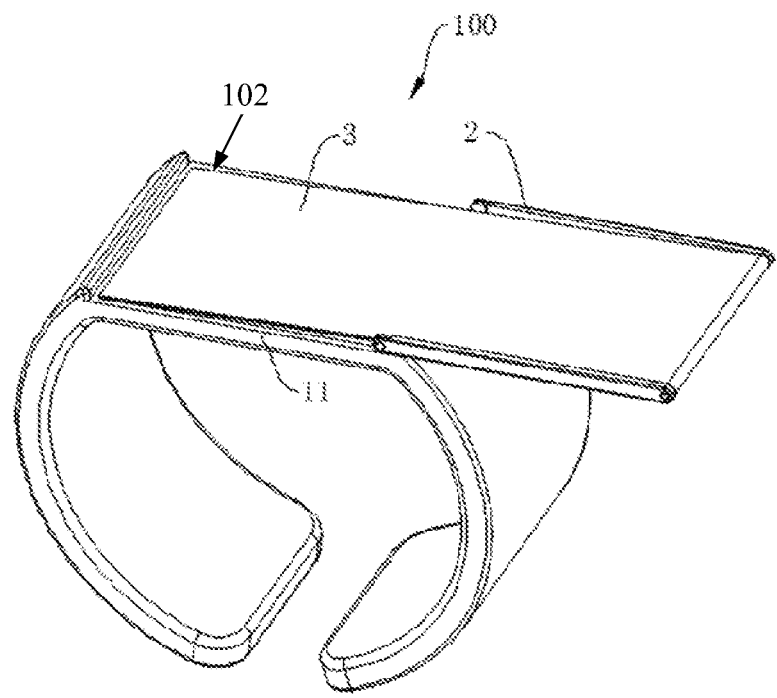
FIG. 2 is a structural schematic view of the smart bracelet of FIG. 1 being unfolded.

As shown in FIG. 1 to FIG. 2, a smart bracelet 100 provided by an exemplary embodiment of the present application, includes a base frame 1, a rotating assembly 2, and a flexible display screen 3. The base frame 1 includes a pedestal 11 and two ring bands 10 and the two ring bands 10 are respectively connected to two opposite ends of the pedestal 11. The rotating assembly 2 is rotatably connected to the pedestal 11. The flexible display screen 3 is supported by the pedestal 11 and the rotating assembly 2. When the rotating assembly 2 is folded relative to the pedestal 11 (as shown in FIG. 1), the flexible display screen 3 is bent and has a first display area 101. When the rotating assembly 2 is unfolded relative to the pedestal 11 (as shown in FIG. 2), the flexible display screen 3 is unfolded and has a second display area 102. The second display area 102 is larger than the first display area 101.

In the embodiment, the smart bracelet 100 may obtain the first display area 101 or the second display area 102 by rotating the rotating assembly 2, to make the rotating assembly 2 to be folded or unfolded relative to the pedestal 11. The second display area 102 is larger than the first display area 101, thus the display area of the smart bracelet 100 is changeable to meet various display requirements, especially large-screen display requirements.

It will be appreciated that, when the rotating assembly 2 is folded relative to the pedestal 11, a center of the rotating assembly 2 overlaps with the pedestal 11. When the rotating assembly 2 is unfolded relative to the pedestal 11, the center of the rotating assembly 2 is away from the pedestal 11.

Preferably, the flexible display screen 3 may be a display panel, a touch panel, or the display panel stacked on the touch panel.

Furthermore, as shown in FIG. 1 to FIG. 5, as an alternative exemplary embodiment, the pedestal 11 includes a supporting member 12 and a frame 13 surrounding the supporting member 12. The supporting member 12 includes a top surface 121, a transitional surface 122, and a bottom surface 123, which are sequentially connected. The top surface 121 and the bottom surface 123 are respectively formed on two opposite sides of the supporting member 12.

The rotating assembly 2 includes a first side surface 201 and a second side surface 202 opposite to the first side surface 201. When the rotating assembly 2 is folded relative to the pedestal 11, the top surface 121 faces to the first side surface 201, and the second side surface 202 is away from the top surface 121.

The flexible display screen 3 is commonly supported by the top surface 121, the first side surface 201 and the second side surface 202. When the rotating assembly 2 is folded relative to the pedestal 11 (as shown in FIG. 1), an area of the flexible display screen 3 supported by the second side surface 202 is a display area having the first display area 101. When the rotating assembly 2 is unfolded relative to the pedestal 11 (as shown in FIG. 2), an area of the flexible display screen 3 supported by both of the top surface 121 and the first side surface 201 is a display area having the second display area 102.

It will be appreciated that, the first side surface 201 and the second side surface 202 are not limited to a certain surface, and the first side surface 201 and the second side surface 202 are mainly configured to represent an orientation relationship and are configured to represent two opposite orientations of the rotating assembly 2.

Furthermore, as shown in FIG. 1 to FIG. 5, as an alternative exemplary embodiment, the rotating assembly 2 includes a movable end 203 and a connecting end 204 opposite to the movable end 203. The connecting end 204 connects to a first end 1211 of the top surface 121 by a hinge structure 205, and the movable end 203 may rotate around the connecting end 204. For example, the movable end 203 may be close to a second end 1212 of the top surface 121 (the first end 1211 of the top surface 121 is opposite to the second end 1212 of the top surface 121) to make the rotating assembly 2 to be folded relative to the pedestal 11. At this time, the first side surface 201 of the rotating assembly 2 formed between the connecting end 204 and the movable end 203 faces towards the top surface 121. The movable end 203 may be away from the second end 1212 of the top surface 121 to make the rotating assembly 2 to be unfolded relative to the pedestal 11. At this time, the second side surface 202 of the rotating assembly 2 formed between the connecting end 204 and the movable end 203 is away from the top surface 121.

Preferably, the frame 13 includes a limiting step 131, the limiting step 131 is formed on the second end 1212 of the top surface 121, and the limiting step 131 is configured to limit the flexible display screen 3. It will be appreciated that, the limiting step 131 may also limit the rotating assembly 2.

Furthermore, as shown in FIG. 1 to FIG. 6, as an alternative exemplary embodiment, the first end 1211 of the top surface 121 is formed on an end of the top surface 121 adjacent to the transitional surface 122. A protruding shaft 2051 is formed at each of the two sides of the first end 1211 of the top surface 121. The connecting end 204 of the rotating assembly 2 defines two through holes 2052 or two grooves. The two through holes 2052 or the two grooves cooperate with the protruding shafts 2051 to form the hinge structure 205, thus the rotating assembly 2 may be rotatably connected to the pedestal 11.

Of course, in other exemplary embodiments, the protruding shaft may be formed at each of the two sides of the connecting end 204 of the rotating assembly 2. Two through holes or two grooves are formed at the first end 1211 of the top surface 121. The two through holes or the two grooves cooperate with the protruding shafts to form the hinge structure 205.

Preferably, the supporting member 12 further includes a connecting surface 124 connecting the top surface 121 and the bottom surface 123, and the connecting surface 124 also connects to the transitional surface 122. The connecting surface 124 connects to the frame 13.

Figure 3:
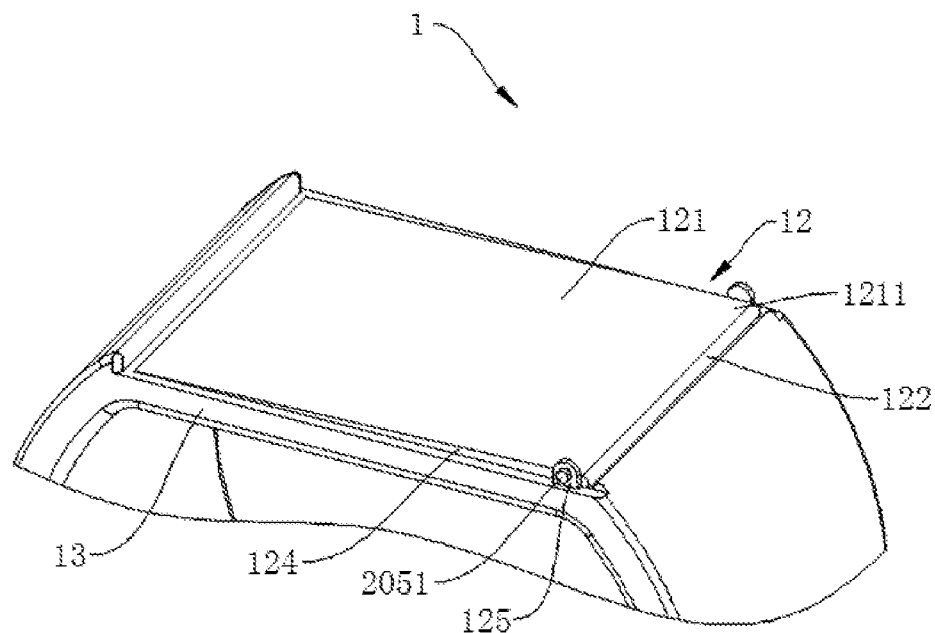
FIG. 3 is a structural schematic view of a base frame of the smart bracelet of FIG. 1.
Figure 4:
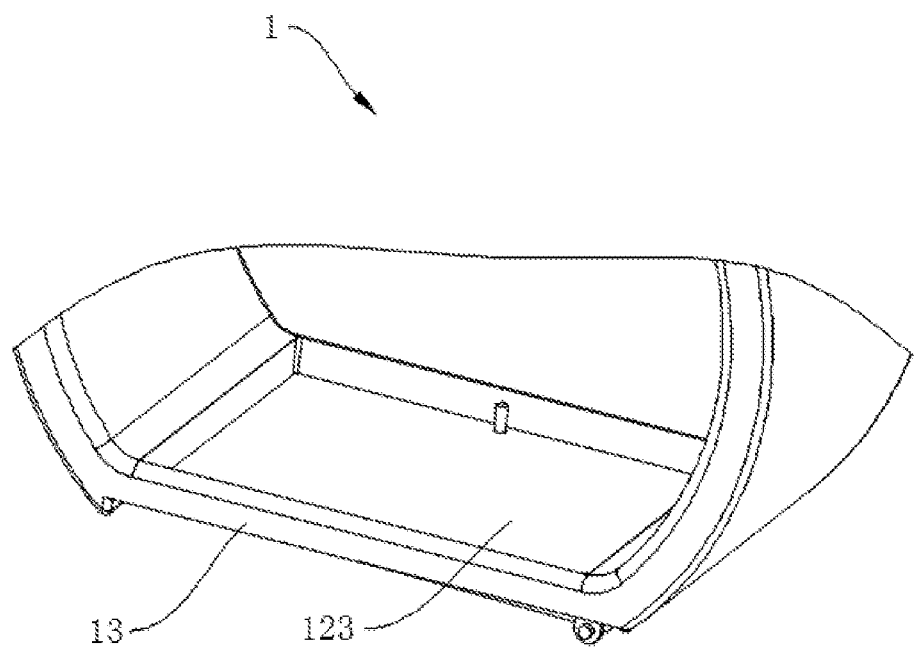
FIG. 4 is a structural schematic view of the base frame of FIG. 3 viewed from another angle.

As shown in FIG. 3, alternatively, a supporting piece 125 is formed on each of the two opposite sides of the first end 1211 of the top surface 121, and the protruding shaft 2051 is protruded on the supporting piece 125. The supporting pieces 125 may be formed on the connecting surface 124, or on the frame 13.

Furthermore, as shown in FIG. 1 to FIG. 5, FIG. 7, and FIG. 8, as an alternative exemplary embodiment, a gap 120 is formed between the transitional surface 122 and the frame 13. The flexible display screen 3 passes through the gap 120 and extends to the bottom surface 123 of the supporting member 12. For example, the flexible display screen 3 sequentially passes through the top surface 121 of the supporting member 12, the connecting end 204 of the rotating assembly 2, the movable end 203, and the connection end 204, and then passes through the gap 120 and extends to the bottom surface 123 of the supporting member 12.

Preferably, the transitional surface 122 is substantially an arc surface with a smooth transition, thus the friction of the flexible display screen 3 may be avoided, and a resistance that the flexible display screen 3 passes through the gap 120 or moves within the gap 120 may be reduced.

Figure 5:
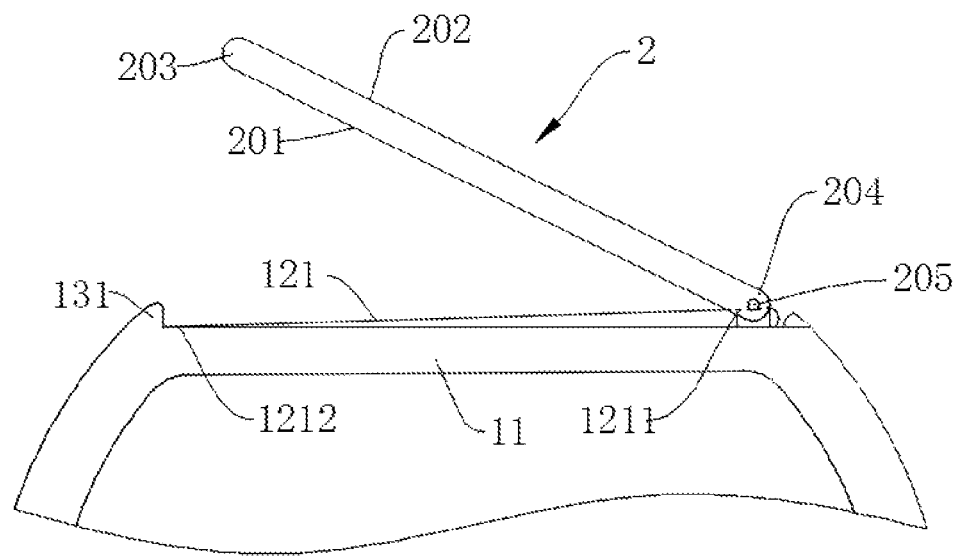
FIG. 5 is one partial structural schematic view of the smart bracelet of FIG. 1.
Figure 7:
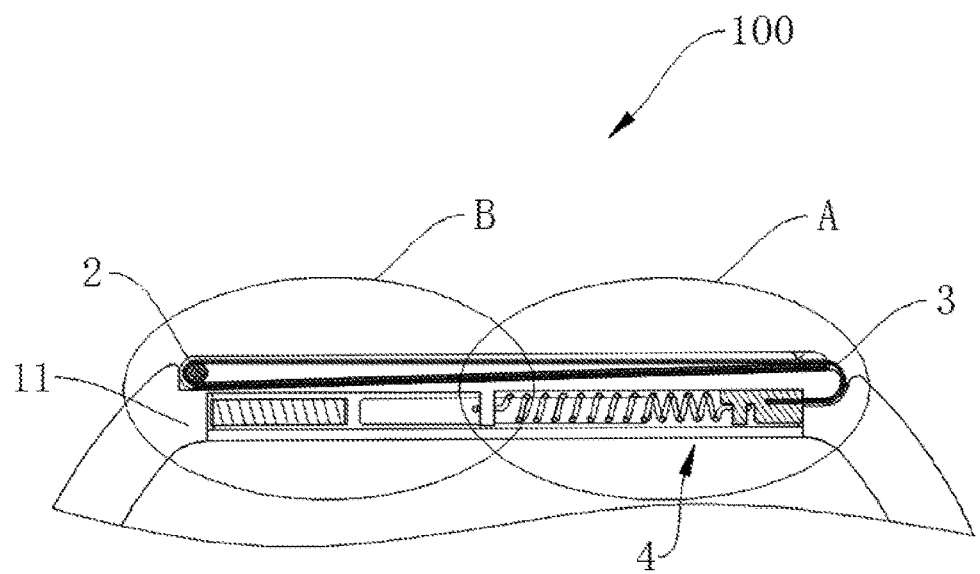
FIG. 7 is a cross-sectional, structural schematic view of the smart bracelet of FIG. 1.
Figure 11:
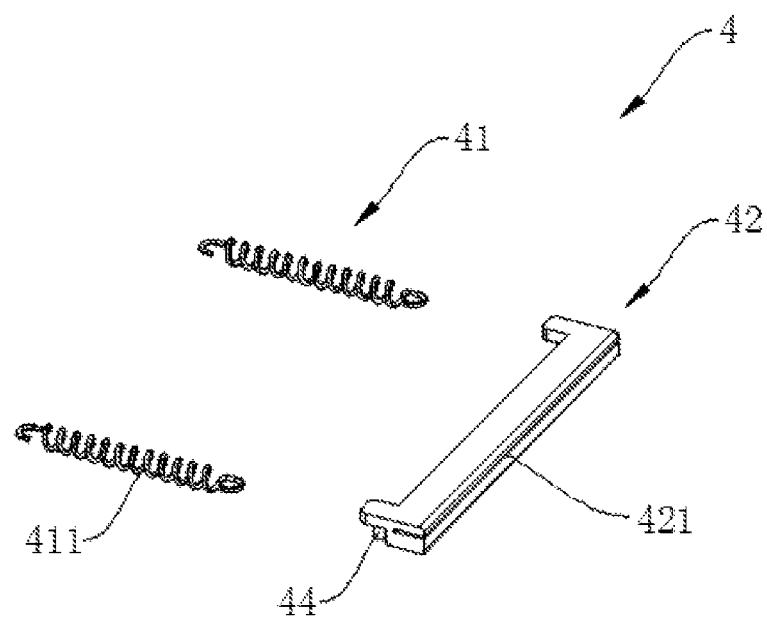
FIG. 11 is an exploded schematic view of a tensioning assembly of the smart bracelet of FIG. 1.

Furthermore, as shown in FIG. 5, FIG. 7, and FIG. 11, as an alternative exemplary embodiment, the smart bracelet 100 further includes a tensioning assembly 4, and the tensioning assembly 4 locates on the bottom surface 123 of the supporting member 12, and is configured to tense the end of the flexible display screen 3 extending to the bottom surface 123, thus making the flexible display screen 3 to be always in a flat state.

Preferably, the tensioning assembly 4 includes an elastic member 41 and a holding member 42. The holding member 42 is configured to hold the flexible display screen 3. One end of the elastic member 41 connects to the bottom surface 123 of the supporting member 12, the other end of the elastic member 41 connects to the holding member 42, and the elastic member 41 may be always kept in a stretched state, thus making the end of the flexible display screen 3 extending to the bottom surface 123 to be always under tension.

Preferably, the top surface 121 of the supporting member 12 may be substantially a plane, and a portion of the flexible display screen 3 is fitted on the top surface 121, thus making a fixation between the flexible display screen 3 and the top surface 121 to be realized. A portion of the flexible display screen 3 is arranged on the first side surface 201 and the second side surface 202, the flexible display screen 3 may move relative to the rotating assembly 2. Since a fixed end (that is, the end fitted on the top surface 121) of the flexible display screen 3 is fixed on the top surface 121, a tensioning end (that is, the end extending to the bottom surface 123) of the flexible display screen 3 is tensioned by the tensioning assembly 4, thus making the portion of the flexible display screen 3 arranged on the rotating assembly 2 to be always in a tight and flat state. Thus, the flexible display screen 3 may have a good display effect, and have an accurate touch sensing performance.

Preferably, when the rotating assembly 2 is folded relative to the pedestal 11, and the holding member 42 locates at a first position. When the rotating assembly 2 is unfolded relative to the pedestal 11, the holding member 42 locates at a second position, and the first position is closer to the gap 120 than the second position.

Figure 8:
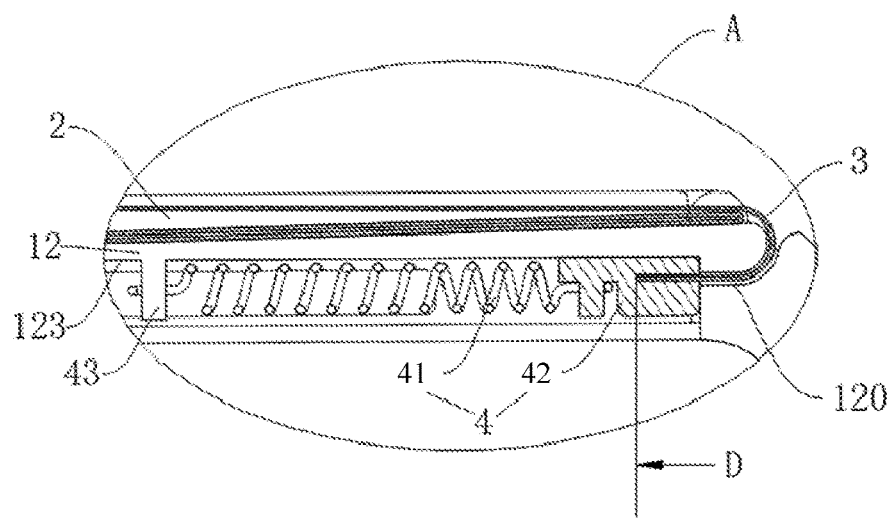
FIG. 8 is an enlarged view of the circled portion A of FIG. 7.
Figure 9:
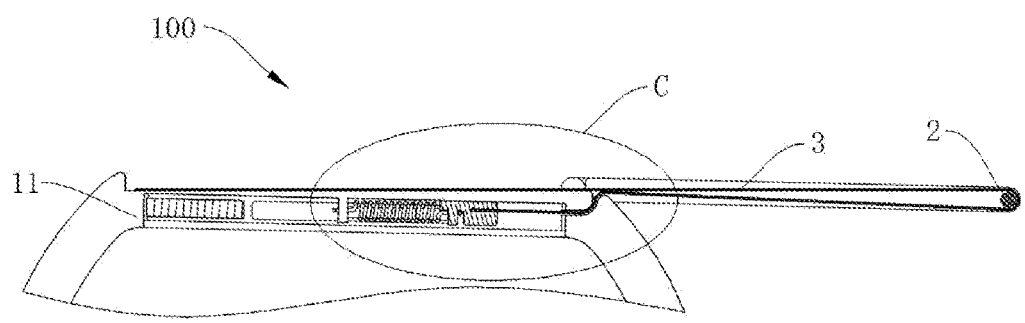
FIG. 9 is a cross-sectional, structural schematic view of the smart bracelet of FIG. 2.
Figure 10:
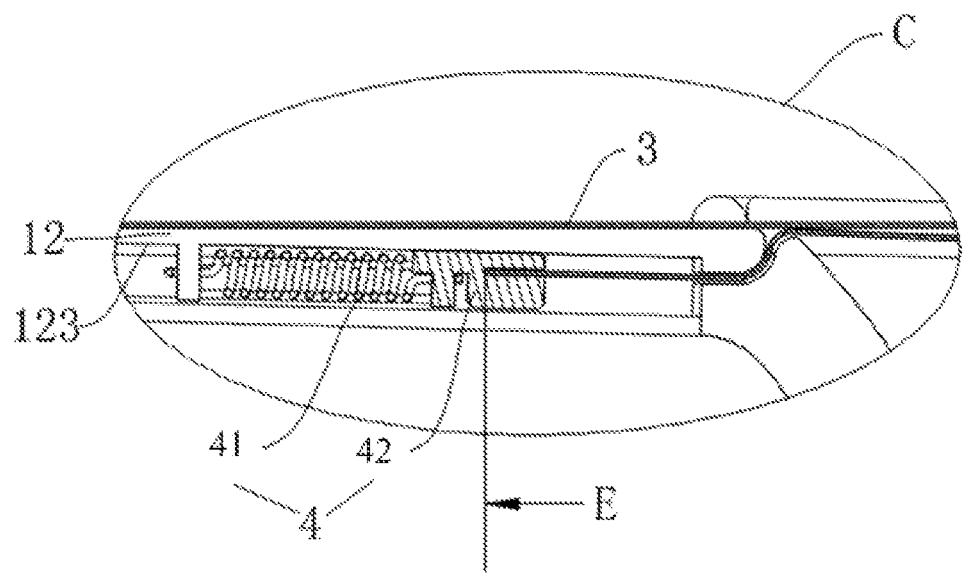
FIG. 10 is an enlarged view of the circled portion C of FIG. 9.

For example, as shown in FIG. 7 and FIG. 8, when the rotating assembly 2 is folded relative to the pedestal 11, the tensioning end of the flexible display screen 3 is hold by the holding member 42 to be located at the first position D. As shown in FIG. 9 and FIG. 10, when the rotating assembly 2 is unfolded relative to the pedestal 11, the tensioning end of the flexible display screen 3 is hold by the holding member 42 and moves to the second position E under the tension of the tensioning assembly 4. The first position D is closer to the gap 120 than the second position E. In the embodiment, the tensioning assembly 4 may automatically adjust the position of flexible display screen 3 according to the use of the smart bracelet 100, thus a problem that the length change of the flexible display screen 3 above the bottom surface 123 under different display areas may be solved.

Preferably, a fixing column is protruded on the bottom surface 123 of the supporting member 12, and one end of the elastic member 41 connects to the fixing column. For example, two first fixing columns 43 are protruded on the bottom surface 123 of the supporting member 12. The elastic member 41 includes two springs 411. The holding member 42 includes two second fixing columns 44. The two second fixing columns 44 are respectively arranged on two opposite ends of the holding member 42. Two opposite ends of each spring 411 correspondingly connects the first fixing column 43 and the second fixing column 44. The two springs 411 are kept in tension. The holding member 42 defines a slot 421, thus the tensioning end of the flexible display screen 3 is inserted into the slot 421 to make the flexible display screen 3 to be fixed to the holding member 42.

Figure 12:
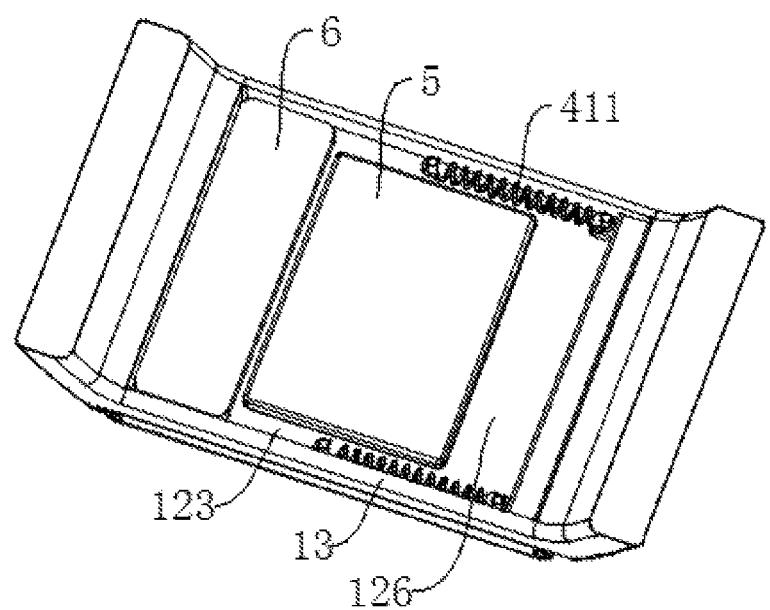
FIG. 12 is another partial structural schematic view of the smart bracelet of FIG. 1.
Figure 13:
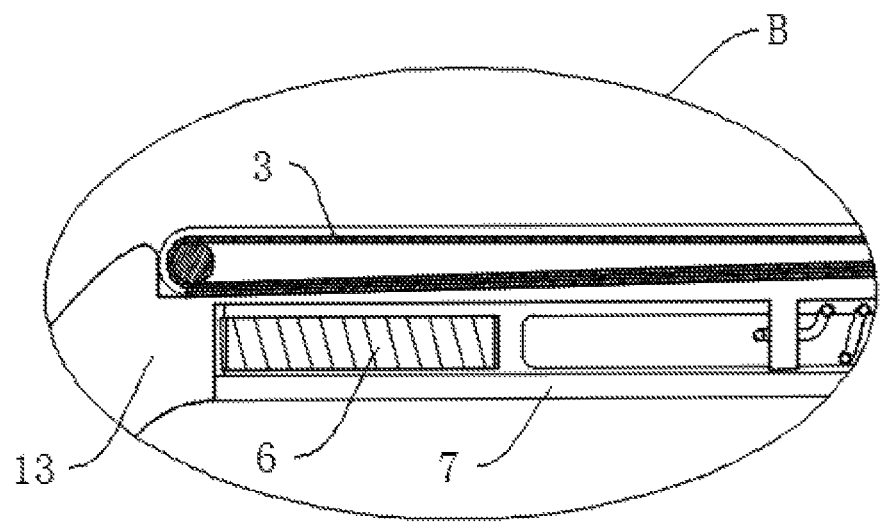
FIG. 13 is an enlarged view of the circled portion B of FIG. 7.

Furthermore, as shown in FIG. 7, FIG. 12 and FIG. 13, as an as an alternative exemplary embodiment, a receiving groove 126 is formed between the bottom surface 123 of the supporting member 12 and the frame 13. The smart bracelet 100 further includes a battery 5, a controlling module 6, and a back plate 7. The controlling module 6 is electrically connected with the flexible display screen 3. The battery 5 is electrically connected with the controlling module 6, and is configured to provide power for the controlling module 6. The controlling module 6 and the battery 5 are received in the receiving groove 126. The back plate 7 is connected to the frame 13, and is configured to seal the receiving groove 126.

The tensioning assembly 4 is received in the receiving groove 126. The battery 5 and/or the receiving groove 126 may be arranged between the two springs 411, thus the assembly received in the receiving groove 126 may be compact, to facilitate the miniaturized design of the smart bracelet 100.

Figure 6:
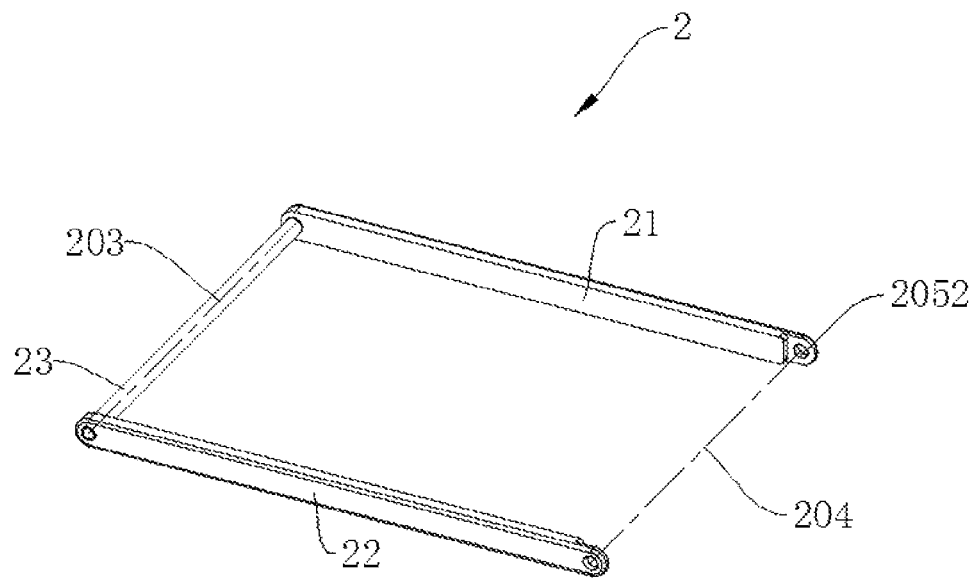
FIG. 6 is a structural schematic view of a rotating assembly of the smart bracelet of FIG. 1.

Furthermore, as shown in FIG. 5 and FIG. 6, as an as an alternative exemplary embodiment, the rotating assembly 2 includes a first side arm 21, a second side arm 22, and a connecting rod 23. The first side arm 21, the second side arm 22, and the connecting rod 23 may be substantially in a stripe shape. One end of the first side arm 21 and one end of the second side arm 22 form the connecting end 204 of the rotating assembly 2. One end of the first side arm 21 and one end of the second side arm 22 define a through hole 2052 or a groove. The connecting rod 23 connects the other end of the first side arm 21 and the other end of the second side arm 22 to form the movable end 203.

As shown in FIG. 1, FIG. 2, FIG. 6, FIG. 7, and FIG. 9, a gap between the first side arm 21 and the second side arm 22 is larger than a width of the flexible display screen 3, thus the flexible display screen 3 may be move relative to the first side arm 21 and the second side arm 22, and may be adjusted to be at the most suitable position at any time according to the use of the smart bracelet 100.

Preferably, as shown in FIG. 2 and FIG. 3, the top surface 121 has a certain inclination, thus when the rotating assembly 2 is unfolded relative to the pedestal 11, the display area of the flexible display screen 3 may be flat. For example, a height between the bottom surface 123 and the top surface 121 of the pedestal 11 is gradually increased toward the transitional surface 122.

Figure 14:
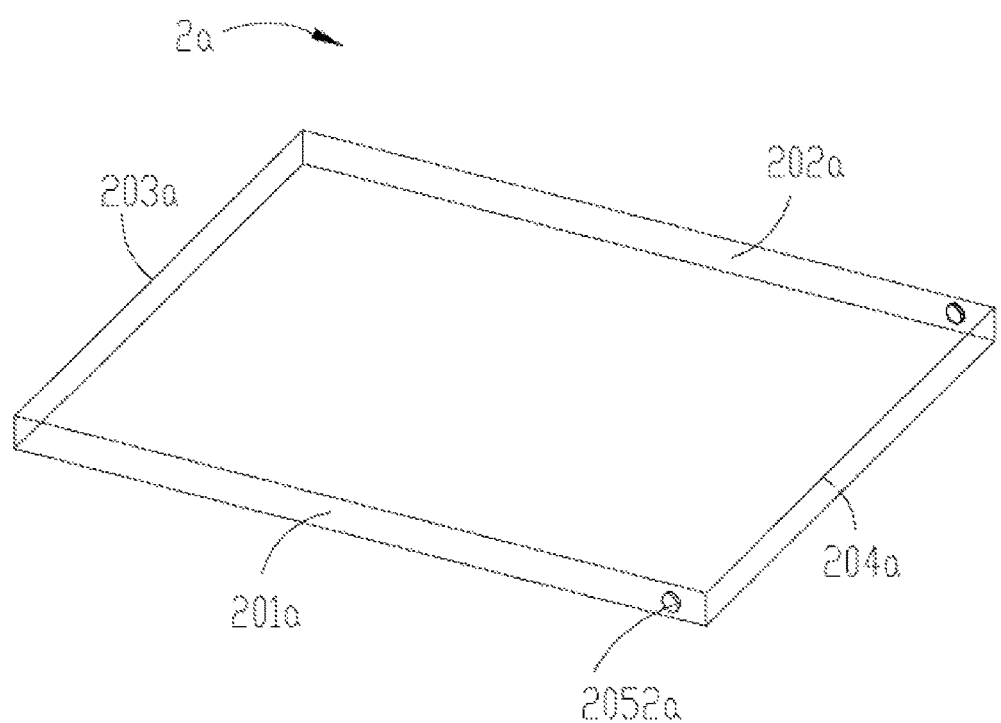
FIG. 14 is a structural schematic view of a rotating assembly of a smart bracelet provided by another exemplary embodiment of the present application.

Of course, as shown in FIG. 6 and FIG. 14, in another exemplary embodiment, the rotating assembly 2 may be a rotating plate 2a. The rotating plate 2a is substantially rectangular. Two opposite ends 203a, 204a of the rotating plate 2a are the movable end 203 and the connecting end 204 of the rotating assembly 2, respectively. The end 204a of the rotating plate 2a corresponding to the connecting end 204 defines through holes 2052a or grooves. The first side surface 201 and the second side surface 202 of the rotating assembly 2 are formed on two opposite surfaces 201a, 202a of the rotating plate 2a.

The embodiments of the present application have been described in detail above, and the specific principles of the present application and the implementation manners have been described in specific examples. The above embodiments are only used to help understand the method of the present application and its core ideas. At the same time, persons of ordinary skill in the art, based on the idea of the present invention, will have changes in specific implementation manners and application ranges. In summary, the contents of the present specification should not be construed as limiting the present application.

What is claimed is:

1. A smart bracelet, comprising:
   a pedestal;
   a rotating assembly rotatably coupled to the pedestal; and
   a flexible display screen supported by the pedestal and the rotating assembly, when the rotating assembly is folded relative to the pedestal, the flexible display screen is bent and has a first display area, when the rotating assembly is unfolded relative to the pedestal, the flexible display screen is unfolded and has a second display area, and the second display area is larger than the first display area.

2. The smart bracelet of the claim 1, wherein the pedestal comprises a top surface, the rotating assembly comprises a first side surface and a second side surface opposite to the first side surface, when the rotating assembly is folded relative to the pedestal, the top surface is arranged opposite to the first side surface and away from the second side surface, and the flexible display screen is supported together by the top surface, the first side surface and the second side surface.

3. The smart bracelet of the claim 2, wherein the rotating assembly comprises a movable end and a connecting end opposite to the movable end, the connecting end connects to a first end of the top surface by a hinge structure, and the movable end is configured for rotating around the connecting end.

4. The smart bracelet of the claim 3, wherein a protruding shaft is formed at each of two sides of the first end of the top surface, the connecting end of the rotating assembly defines two through holes or two grooves, and the two through holes or the two grooves cooperate with the protruding shafts to form the hinge structure.

5. The smart bracelet of the claim 4, wherein a supporting piece is formed on each side of the first end of the top surface, and the protruding shaft is formed on the supporting piece.

6. The smart bracelet of claim 2, wherein the pedestal comprises a supporting member and a frame surrounding the supporting member, the supporting member comprises the top surface, a transitional surface, and a bottom surface sequentially connected to each other, a gap is formed between the transitional surface and the frame, and the flexible display screen passes through the gap and extends to the bottom surface.

7. The smart bracelet of the claim 6, wherein the transitional surface is substantially an arc surface.

8. The smart bracelet of the claim 6, further comprising a tensioning assembly, wherein the tensioning assembly is arranged on the bottom surface, and tenses an end of the flexible display screen extending to the bottom surface.

9. The smart bracelet of the claim 8, wherein the tensioning assembly comprises an elastic member and a holding member, the holding member is configured to hold the flexible display screen, one end of the elastic member couples to the bottom surface of the supporting member, the other end of the elastic member couples to the holding member, the elastic member maintain a stretched state.

10. The smart bracelet of the claim 1, wherein the flexible display screen comprises a display panel and a touch panel stacked on the display panel.

11. The smart bracelet of the claim 6, wherein a receiving groove is formed between the bottom surface and the frame, and the tensioning assembly is received in the receiving groove.

12. The smart bracelet of the claim 11, wherein the smart bracelet further comprises a battery and a controlling module, the controlling module and the battery are received in the receiving groove, the controlling module is electrically connected with the flexible display screen, and the battery is electrically connected with controlling module.

13. The smart bracelet of the claim 11, wherein the smart bracelet further comprises a back plate coupling to the frame for sealing the receiving groove.

14. The smart bracelet of the claim 3, wherein the rotating assembly comprises a first side arm, a second side arm, and a connecting rod, one end of the first side arm and one end of the second side arm forms the connecting end, and the connecting rod is coupled between the other end of the first side arm and the other end of the second side arm to form the movable end.

15. The smart bracelet of the claim 3, wherein the rotating assembly is a rotating plate, and two opposite ends of the rotating plate form the movable end and the connecting end, respectively.

16. The smart bracelet of the claim 9, wherein when the rotating assembly is folded relative to the pedestal, the holding member located at a first position, when the rotating assembly is unfolded relative to the pedestal, the holding member located at a second position, and the first position is closer to the gap than the second position.

17. The smart bracelet of the claim 9, wherein a fixing column is protruded on the bottom surface of the supporting member, and one end of the elastic member couples to the fixing column.

18. The smart bracelet of the claim 6, wherein a height between the bottom surface and the top surface of the pedestal is gradually increased toward the transitional surface.

* * * * *